(12) United States Patent
Frank

(10) Patent No.: US 6,822,941 B1
(45) Date of Patent: Nov. 23, 2004

(54) METHOD AND NETWORK ELEMENT FOR RELAYING EVENT MESSAGES

(75) Inventor: Michael Frank, München (DE)

(73) Assignee: Siemens Aktiengesellschaft, Munich (DE)

( * ) Notice: Subject to any disclaimer, the term of this patent is extended or adjusted under 35 U.S.C. 154(b) by 726 days.

(21) Appl. No.: 09/641,791

(22) Filed: Aug. 18, 2000

Related U.S. Application Data

(63) Continuation of application No. PCT/EP99/01070, filed on Feb. 18, 1999.

(51) Int. Cl.[7] ............................... H04J 1/16; H04J 3/14
(52) U.S. Cl. ....................... 370/241; 370/244; 370/250
(58) Field of Search ............................... 370/241, 252, 370/242, 244, 250, 246; 714/100, 1, 2, 4

(56) References Cited

U.S. PATENT DOCUMENTS

| | | | |
|---|---|---|---|
| 5,155,842 A | | 10/1992 | Rubin |
| 5,404,532 A | | 4/1995 | Allen et al. |
| 5,594,889 A | | 1/1997 | Colgate et al. |
| 5,774,456 A | * | 6/1998 | Ellebracht et al. .......... 370/242 |
| 6,108,309 A | * | 8/2000 | Cohoe et al. ............... 370/241 |
| 6,421,323 B1 | * | 7/2002 | Nelson et al. .............. 370/249 |

FOREIGN PATENT DOCUMENTS

EP      0 687 089 A1      12/1995

OTHER PUBLICATIONS

"Information Technology—Open Systems Interconnection—System Management: Event Report Management Function", International Telecommunication Union, CCITT, X.734, dated 1993, pp. 1–18, as mentioned on p. 2 of the specification.

Published International Application No. WO 96/24899 (Israelsson et al.), dated Aug. 15, 1996.

* cited by examiner

*Primary Examiner*—Ajit Patel
(74) *Attorney, Agent, or Firm*—Laurence A. Greenberg; Werner H. Stemer; Gregory L. Mayback

(57) ABSTRACT

An explanation is given of a method for operating a telecommunications network in which a network element at a network node of a telecommunications network is controlled by a switching computer. Event messages containing details about events occurring during the operation of the computer are generated in the computer. In the course of relaying the event messages, a sequence of destinations is used in which each destination occurs only once. Conditions for the destinations are tested using the details in the event messages in the order prescribed by the sequence.

13 Claims, 6 Drawing Sheets

F1 = AND {i1, i2}

METHOD AND NETWORK ELEMENT FOR RELAYING EVENT MESSAGES

CROSS-REFERENCE TO RELATED APPLICATIONS

This is a continuation of copending International Application PCT/EP99/01070, filed Feb. 18, 1999, which designated the United States.

BACKGROUND OF THE INVENTION

FIELD OF THE INVENTION

The invention relates to a method for operating a telecommunications network, called telecoms network for short, in which a network element at a network node of the telecoms network is controlled by a switching computer. By way of example, the network element is a switching center, a concentrator unit for connecting a plurality of subscribers to a transmission link or, in the case of an asynchronous transfer mode (ATM) network, a so-called cross-connector. During operation, the switching computer of the network element generates event messages containing details about events that have occurred. An event message is relayed to a prescribed destination only when at least one condition defined for this destination is met by the details in the event message to be relayed. Destinations are protocol files on the network element or control computer sending the event messages, for managing the telecoms network.

A method of this type is explained in the X.734 Standard (1992) "Information Technology—Open Systems Interconnection—Systems Management—Event Report Management Function". The X.734 Standard was published by the ITU-T (International Telecommunication Union), formerly CCITT (International Telegraph and Telephone Consultative Committee). According to the X.734 Standard, use is made of so-called discriminators, with each of which at least one condition and at least one destination are associated. When an event message to be relayed is processed, a test must be performed for each discriminator to determine whether its condition or one of its conditions is met by the event message to be relayed. If a condition of a discriminator is met, then the destination or destinations associated with the discriminator is or are stored in a results file. Once all the discriminators have tested the event message to be relayed, the destinations contained in the destination file are ordered. In the case of multiply contained destinations, all the destinations except for one destination are then deleted. This measure prevents the event message from being relayed multiply to the same destination.

The known method has the disadvantage that additional method steps are required for sorting and deleting multiply present destinations. This is disadvantageous in particular because several hundred event messages can occur each second, which have to be evaluated by several thousand discriminators.

SUMMARY OF THE INVENTION

It is accordingly an object of the invention to provide a method and a network element for relaying event messages that overcome the disadvantages of the prior art devices and methods of this general type, which allows a multiplicity of event messages to be relayed rapidly.

With the foregoing and other objects in view there is provided, in accordance with the invention, an operating method, which includes providing a telecommunications network having a network element with a switching computer at a network node. Event messages containing details about events occurring during the operation of the network element in the switching computer are then generated. At least one condition is assigned to each of a plurality of predetermined destinations for defining each of the predetermined destinations. The predetermined destinations are organized into a sequence of predetermined destinations in which each of the predetermined destinations occurs once. Each of the predetermined destinations are tested in an order prescribed by the sequence of predetermined destinations for an occurrence of the at least one condition. Finally, an event message is relayed to a respective predetermined destination of the predetermined destinations only when the at least one condition defined for the respective destination is met by the details in the event message to be relayed.

The invention is based on the insight that in a simple method for relaying the event messages, it is necessary to avoid multiple calculations and the complex sorting of the destinations in the case of the relaying of each event message. Therefore, in the method according to the invention, the destinations are only sorted once before the beginning of the method, thereby producing a sequence in which each destination occurs precisely once. The sequence is then used for processing a multiplicity of event messages. The sequence has to be changed only when new destinations are added or old destinations are no longer valid. Since the sorting of the destinations is already concluded before the event messages are produced, the event messages can be relayed very rapidly in the case of the method according to the invention.

In the method according to the invention, the condition is tested for each destination in the order prescribed by the sequence of destinations. If the condition is met, the destination is entered into the destination file. Once all the destinations have been processed, the destinations are already ordered in the destination file. This is true even when there are a plurality of alternative conditions for one destination.

In the method according to the invention, the destinations are ordered in an all-embracing manner across the boundaries prescribed by the discriminators. The conditions are then also assigned to the individual destinations beyond the boundaries of the discriminators. Therefore, conditions of different discriminators may also be associated with one destination. The conditions for a destination then form a set of conditions.

In a development of the invention, the testing of the conditions within a set of conditions is terminated as soon as a condition is met by the details in the event message to be relayed. This measure is based on the insight that the event message only has to be relayed once to a destination. Since the conditions of the set of conditions are alternatives, it suffices to send the event message to the associated destination as soon as just one of the conditions is met.

If, furthermore, the conditions of the set of conditions are tested in a sequence in which the conditions are ordered according to how often they are met by the details in event messages to be relayed, then the testing of the conditions of a set of conditions will in the majority of cases already be terminated after the testing of the first condition or after the testing of the first two conditions. Only in very rare cases will it be necessary to test all the conditions of the set of conditions. The testing complexity and hence the number of method steps are reduced further by this measure.

In one exemplary embodiment, the sequence of destinations is defined by a list of chained elements. The elements each contain an address reference to the subsequent element. By altering the address references, it is easily possible to insert elements into the list or to remove elements from the list. Each element in the list is assigned precisely one destination of the sequence. Instead of the list, it is also possible to use a table or another suitable data structure.

In another development of the method according to the invention, in which interim results determined from the details in the event messages in accordance with at least one condition are logically combined by logic operations, a Boolean table is used which is already stored before the generation of the event messages in the memory of the computer. By use of the Boolean table, the interim results can then be logically combined very rapidly in accordance with the logic operation prescribed in the condition. Only one memory cell has to be read. The relaying becomes very simple and very rapid as a result of the use of the Boolean table.

In a development, the method according to the invention is made rapid by the avoidance of multiple calculations. Conditions which have already been calculated are noted by a test flag for each condition. In addition, the result of the calculation is noted. If a condition has to be tested again during the method, then the fact that this condition has already been tested is identified from the test flag. It is only necessary to use the test result that has already been determined. Repeated testing is obviated. A similar method is also used for the interim results, in which multiple calculations are prevented using a marker.

In accordance with an added feature of the invention, a marker stored in the memory of the computer is used if at least one interim result has been determined. A first value of the marker indicates that the interim result has not yet been determined, and a second value of the marker indicates that the interim result has already been determined. The interim result is determined from the details if the marker has the first value. The interim result is then stored in the memory, and the marker obtains the second value. A stored interim result stored in the memory is used if the marker has the second value.

The requirements imposed by the X.734 Standard mentioned above can also be fulfilled in the method according to the invention, if the destinations and the conditions are managed in the switching computer in such a way that they can at any time be assigned to data objects whose data contain at least one condition and at least one destination. These data objects correspond to the discriminators mentioned in the X.734 Standard. In this development of the method according to the invention, the destinations and conditions can be maintained by at least one control computer, which expects the data structure prescribed in the X.734 Standard, i.e. discriminators. 12. More specifically, the maintenance step includes prescribing, erasing, and/or interrogating the predetermined destinations and the conditions.

In accordance with an additional feature of the invention, the predetermined destinations are provided as addresses of other computers for managing the telecommunications network. Furthermore, the predetermined destinations may be provided as protocol files in which the event messages are stored.

In accordance with another feature of the invention, the network element can be a switching centers, a cross-connector and a concentrator unit.

In accordance with a further added feature of the invention, the telecommunications network is a fixed network, a mobile radio network or a network having a fixed network component and a mobile radio network component.

The invention additionally relates to a network element that is used in particular for carrying out the method according to the invention. The above-mentioned technical effects also apply, therefore, to this network element.

Other features which are considered as characteristic for the invention are set forth in the appended claims.

Although the invention is illustrated and described herein as embodied in a method and a network element for relaying event messages, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
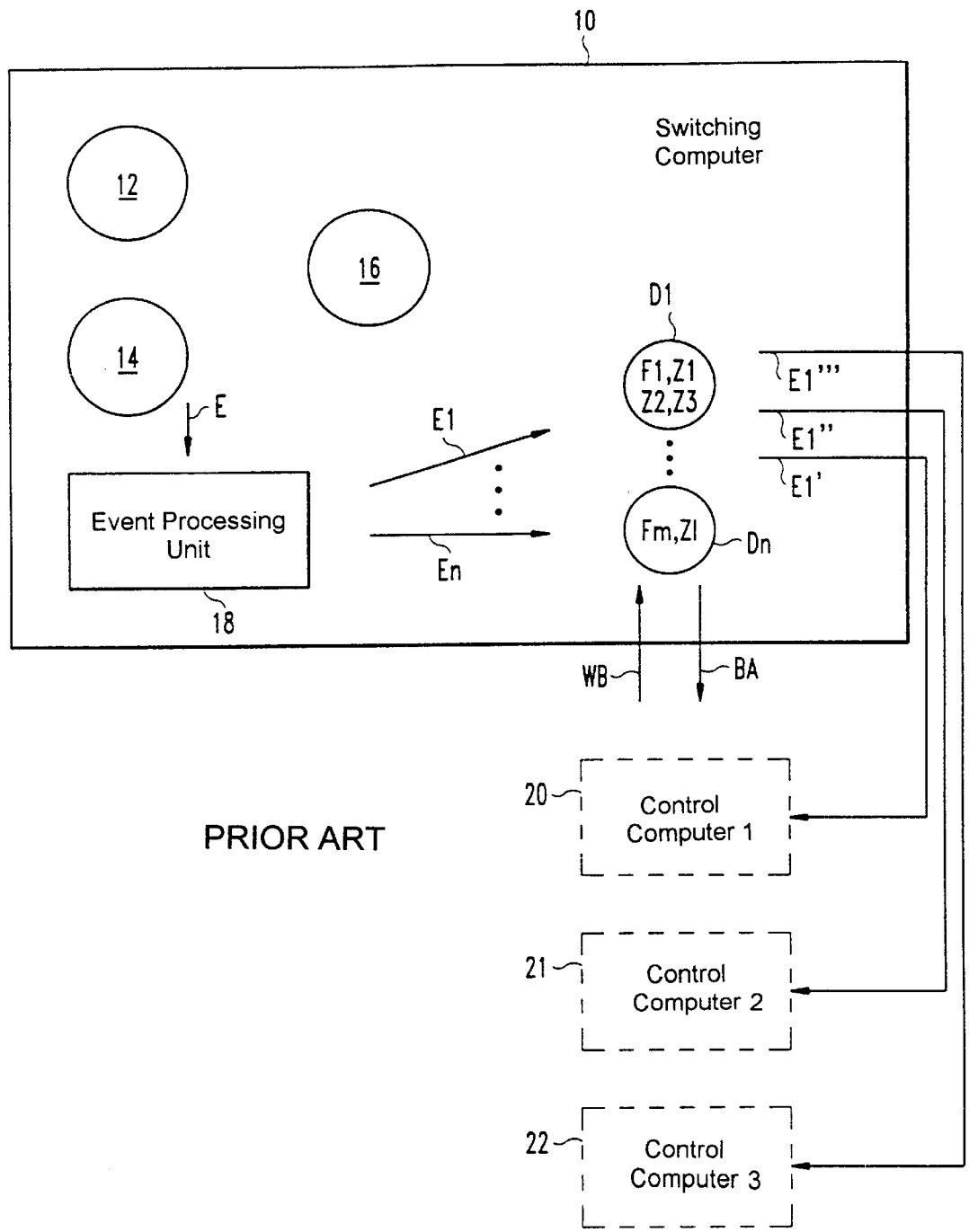
FIG. 1 is a block diagram showing a relaying of event messages according to the invention.

In all the figures of the drawing, sub-features and integral parts that correspond to one another bear the same reference symbol in each case. Referring now to the figures of the drawing in detail and first, particularly, to FIG. 1 thereof, there is shown a relaying of an event message E in accordance with the X.734 standard mentioned above. The event message E is generated in a switching computer 10, which controls a non-illustrated switching center. Many data objects are stored in a memory of the switching computer 10, three objects 12, 14 and 16 of which are illustrated in FIG. 1. The objects 12, 14 and 16 contain data and methods for processing their data. By way of example, the data of a specific subscriber are stored in the data of the object 12. During the operation of the switching computer 10, event messages are generated by the objects 12, 14 and 16, for example when a method for processing the data of one of the objects 12, 14 or 16 is executed by a microprocessor contained in the switching computer 10. The event message E is generated by the object 14 as confirmation to a message processed by the object 14.

An event processing unit 18, which is realized for example as a program in the switching computer 10, processes the event message E. When processing the program, the event processing unit 18 duplicates the event message E to form event messages E1 to En, which are distributed to so-called discriminators D1 to Dn, where n is a natural number ranging from 1 through to the number of discriminators n.

The discriminators D1 to Dn all operate according to the same method, so that only the discriminator D1 is explained.

The discriminator D1 is realized by commands that are stored in the memory of the switching computer 10 and are processed by the microprocessor. During the processing of the event message E1 in the discriminator D1, a test is performed to determine whether details contained in the event message E1 meet a condition prescribed by a filter F1. If the condition F1 is met by the details in the event message E1, then the event message E1 is relayed by event messages E1', E1" and E1'" to control computers 20, 21 and 22, whose destination addresses Z1, Z2 and Z3 are specified in the discriminator D1.

The discriminator Dn contains a filter Fm and a destination address Z1, where m is a natural number corresponding to the number of filters F1 to Fm in the discriminators D1 to Dn and 1 is the number of destination addresses Z1 to Z1 specified in the discriminators D1 to Dn. The values n, m and 1 may be different, because in some instances a plurality of filters F1 to Fm and/or a plurality of destination addresses Z1 to Z1 are specified in the discriminators D1 to Dn. The destination address Z1 to Z1 of a specific destination computer may occur in different discriminators D1 to Dn. The conditions defined by the filters F1 to Fm of different discriminators D1 to Dn may also correspond.

By way of example, new discriminators D1 to Dn may be generated in the switching computer 10 from the remote control computer 20 by maintenance commands WB. The generation of a new discriminator D1 to Dn is confirmed by a confirmation reply BA sent from the switching computer 10 the control computer 20. If appropriate, confirmation messages are additionally sent to the other control computers 21 and 22.

The effect achieved by the method explained below with reference to FIGS. 2 to 5, which method is not discussed in the X.734 standard and differs from the method explained with reference to FIG. 1, is that the event message E is only sent once to each destination Z1 to Z1 whose conditions F1 to Fm are met.

Figure 2:
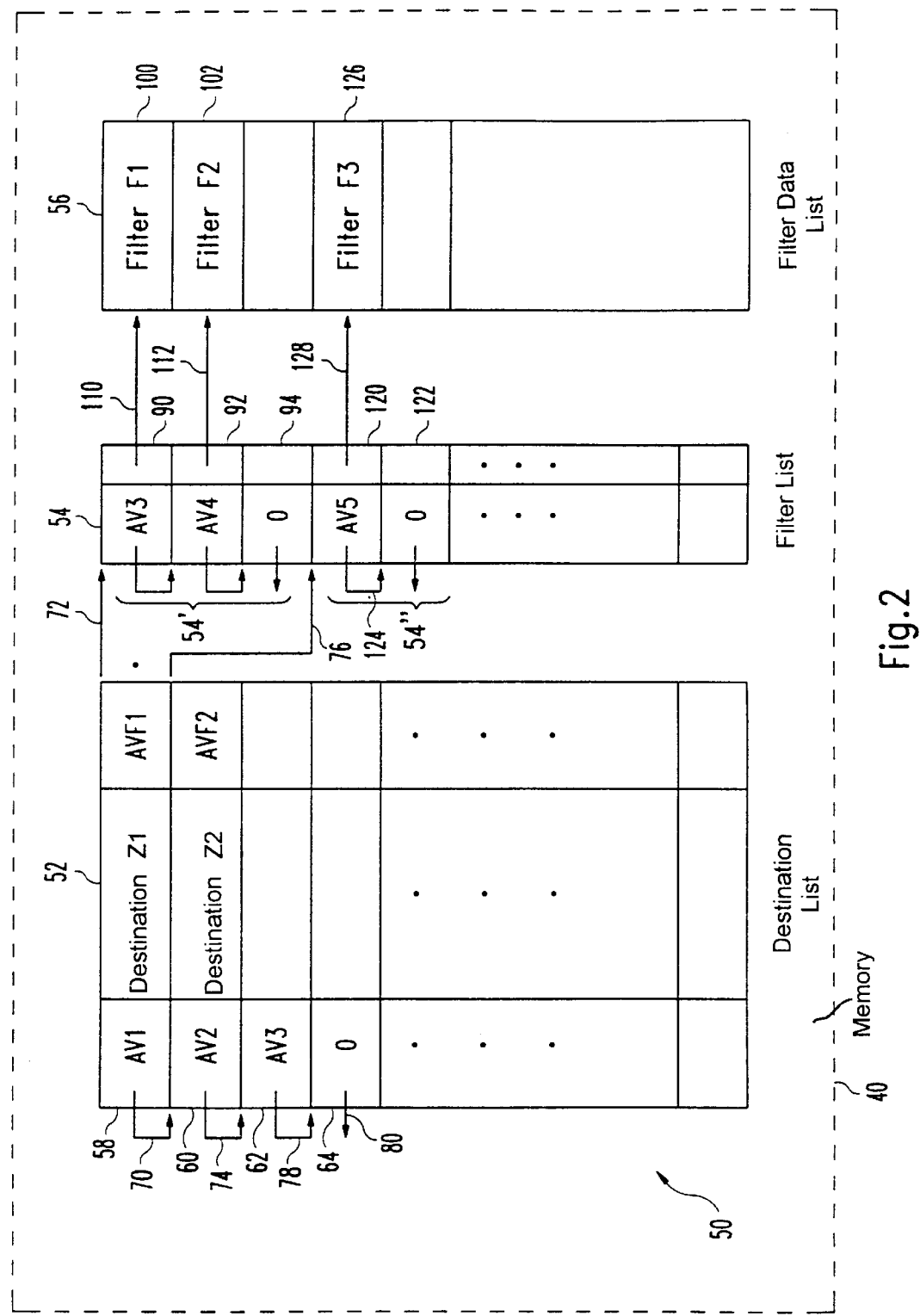
FIG. 2 is a block diagram of a data structure used in a course of relaying an event message.

FIG. 2 shows a data structure 50 used in the course of relaying the event message in accordance with FIG. 1, the data structure 50 being stored in a memory 40 of the switching computer 10. The data structure 50 contains a destination list 52, filter lists 54 and a filter data list 56. The destination list 52 contains four list elements 58 to 64. The elements 58 to 64 have the same structure but different contents. The element 58 contains, in the first data field, an address reference AV1 to the subsequent element 60 in the list 52, also see arrow 70. The destination address of the destination Z1 is noted in a second data field of the element 58. A third data field contains an address reference AVF1 to a first filter list 54' associated with the destination Z1, see arrow 72.

The element 60 contains, in the first data field, an address reference AV2 to the element 62, which follows the element 60 in the destination list 52, see arrow 74. The element 60 relates to the destination Z2, whose destination address is stored in the second data field of the element 60. An address reference AVF2 to the first element of a second filter list 54" associated with the destination Z2 is stored in the third data field of the element 60. In the third element 62, an address reference AV3 refers to the last element 64 in the destination list 52. The last element 64 is identified by a so-called null pointer represented by the address 0 in the first data field, see arrow 80.

The first filter list 54' contains three elements 90, 92 and 94 each containing two address references. The first address reference AV3 in the element 90 refers to the address of the element 92. The first address reference AV4 in the element 92 refers to the next element 94. Since the element 94 is the last element in the filter list 54', it contains the null pointer identified by the address 0.

The second address reference in the element 90 points to filter data 100 of a first filter F1 which are contained in a filter data list 100, see arrow 110. The second address reference in the element 92, on the other hand, points to filter data 102 of a filter F2, see arrow 112. The filter data 100, 102 in the filter list 56 are structured identically, so that only the filter data 100 are explained below with reference to FIG. 3.

The filter list 54" contains two elements 120 and 122. A first address reference AV5 in the element 120 refers to the element 122, also see arrow 124. The first address reference in the element 122 is the null pointer identifying the end of the filter list 54" and having the address 0. In a departure from the example in FIG. 1, the second address reference in the element 120 refers to filter data 126 of a filter F3, see arrow 128. The references indicated by the arrows 110, 112 and 128 may also cross one another. In addition, references to the same filter from different filter lists 54', 54" are possible.

The list structures of the destination list 52, the filter list 54 and the filter data list 56 allow changes to be carried out in a simple manner when setting up new discriminators D1 to Dn. Only the address references AV1 to AV5 have to be altered, in order to insert additional elements into the lists 52, 54 and 56 or to remove elements from the lists 52, 54 to 56. The way in which the data of the data structure 50 are used when an event message EN is processed is explained below with reference to FIGS. 4a and 4b.

Figure 3:
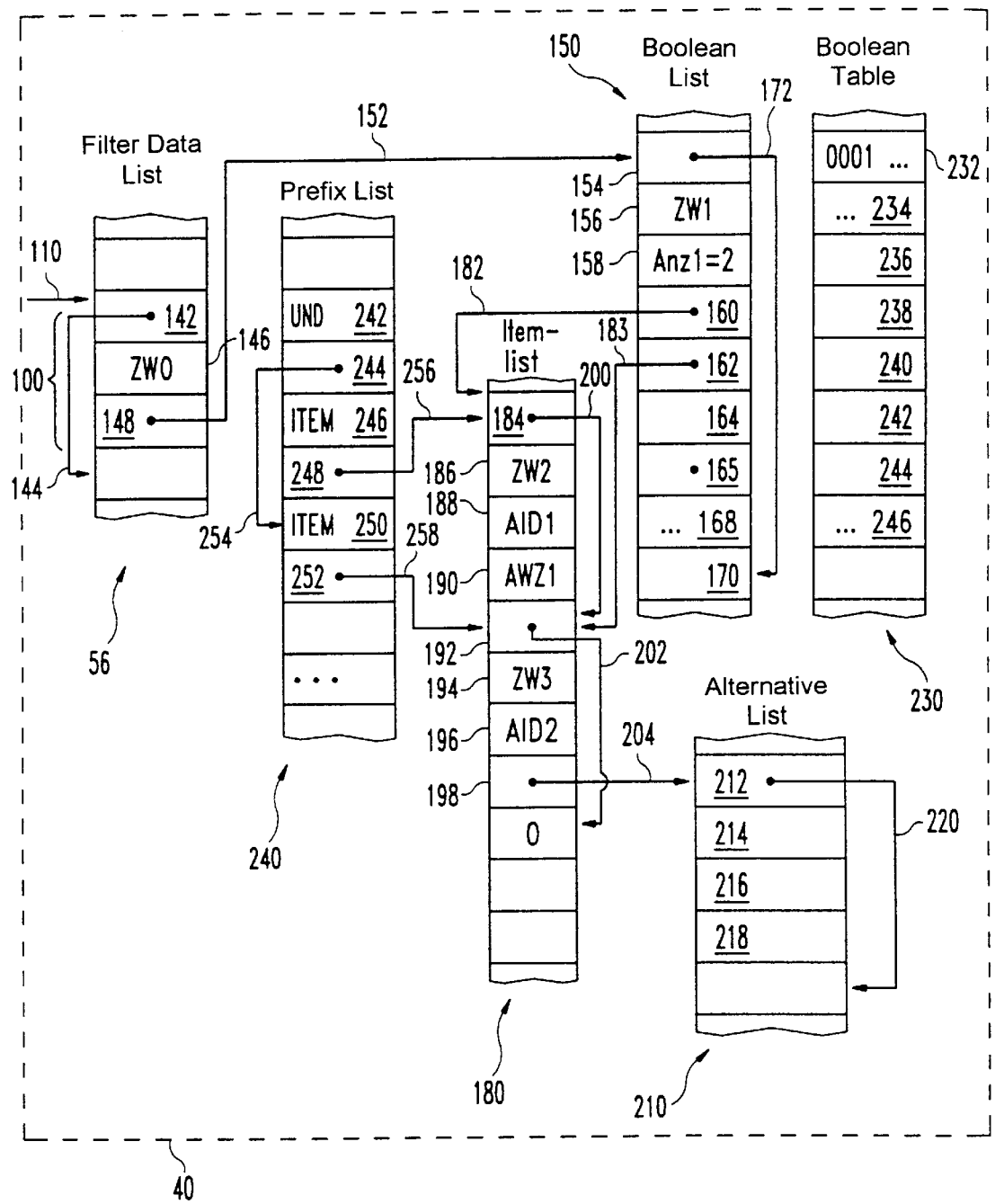
FIG. 3 is a block diagram of a data structure used in the course of calculating a filter.

FIG. 3 shows the filter data 100 and the data structures associated with the filter F1. In a first data field 142 of the filter data 100, an address reference to the next element in the filter data list 56 is stored, see arrow 144. A second data field 146 of the filter data 100 contains a counter value ZWO, which indicates how many discriminators D1 to Dn contain the filter F1. If a new discriminator D1 to Dn in which the filter F1 is contained is generated, then the counter value ZWO is incremented. If, on the other hand, a discriminator D1 to Dn that contains the filter F1 is removed, then the counter value ZWO is decremented. This measure is necessary because the discriminators D1 to Dn are managed. A third data field 148 of the element 142 contains an address reference to a Boolean list 150 associated with the filter F1, see arrow 152.

The filter condition of the filter F1 reads as follows:

$$F1=\text{AND } \{i,i2\},$$

where AND symbolizes the logic AND function, OR symbolizes the logic OR function and NOT symbolizes the logic NOT function. So-called items i1 and i2 contain conditions which have to be met by the details of the event message. The items i1 and i2 will be explained in more detail further below.

Each element in the Boolean list 150 has the same number of data fields in the exemplary embodiment. This number is determined by the maximum number of items occurring in the filter F1 to Fm. A first data field of the element of the Boolean list 150 that is illustrated in FIG. 3 contains data fields 154 to 168. A data field 170 actually belongs to the next element. The data fields 154 to 170 have directly consecutive addresses in the memory 40.

The data field 154 contains an address reference to the first data field 170 of the next element in the Boolean list 150, see arrow 172. Stored in the data field 156 there is a counter value ZW1, which indicates how many discriminators D1 to Dn utilize the Boolean list 150. The number Anz1 of items in the filter F1, i.e. the value 2 in the exemplary embodiment, is stored in the data field 158. Address references to the data of the items that are contained in an item list 180 are stored in the data fields 160 to 168. Only the data fields 160 and 162 are occupied in the filter F1, because the filter only has the two items i1 and i2. The data field 160 contains an address reference to an element of the item list 180 for the item i1, the address reference being indicated by an arrow 182. Four data fields 184 to 190, the contents of which will be explained below, are associated with the first element in the item list 180. Stored in the data field 162 there is an address reference to a first data field of a second element in the item list 180 for the item i2, the address reference being represented by an arrow 183. Not only the data field 192 but also data fields 194, 196 and 198, the contents of which will likewise be explained below, are associated with the second element. The contents of the data fields 184 to 198 are stored in this sequence in memory cells of the memory 40 with consecutive addresses.

The data field 184 is the first data field of an element in the item list 180 and therefore contains an address reference to the next element in the item list 180, see 200, which points directly to the data field 192. Stored in the data field 186, i.e. in the second data field of the element, there is a counter value ZW2, which indicates the number of filters F1 to Fn in which the item i1 occurs. In the management of the item list 180, the counter value ZW2 is used to ascertain when the element relating to the item i1 can be removed. This is the case only when the counter value ZW2 has the value 0. An identifier AID1 of an attribute to which the item i1 relates is stored in the data field 188. A value AWZ1, which is allocated to the attribute in the item i1, is stored in the data field 190.

The data of the item i2 are stored in the data fields 192 to 198 in a similar manner. Thus, an address reference to the next element in the item list 180 is stored in the data field 192, see arrow 202. Since the item i2 is the last item in the item list 180, the address reference in the data field 192 refers to a null pointer which is identified by the address value 0 and thus identifies the last element in the item list 180. Stored in the data field 194 there is a counter value ZW3, whose value indicates the number of filters F1 to Fm in which the item i2 is used. In the data field 196, the attribute to which the item i2 relates is noted by an identifier AID2. An address reference to an alternative list 210 is stored in the data field 198, because, in order to allocate a value to the attribute in the item i2, a plurality of data are necessary which are not all stored in one data field. The necessary data are stored in data fields 214, 216 and 218 of the alternative list 210. An address reference to the next element in the alternative list 210 is stored in the data field 212, see arrow 220.

In the memory 40, the Boolean list 150 is additionally assigned a Boolean table 230, for example by references that are not illustrated or by a fixed address offset. Data fields 232 to 246 each contain a byte whose bit positions contain the value of the filter F1 for specific combinations of item values i1 and i2. Only four bit positions are necessary for the simple filter F1. If the details in the event message E do not meet the conditions specified in the items i1 and i2, i.e. i1=0 and i2=0, then the filter F1 has the value 0. If one of the two items i1 or i2 is not met by the details in the event message E, then the filter F1 likewise has the value 0, i.e. the filter condition is not met. Only if both items i1 and i2 are met by the details in the event message E does the filter F1 have the value 1, i.e. the filter condition is met. For this reason, a 1 is stored in the fourth bit of the data field 232. If there are three items in a filter F1 to Fm, eight bits are necessary in the Boolean table 230. The number of bits required in the Boolean table 230 rises exponentially with an increasing number of items i1 to il.

Furthermore, a so-called prefix list 240 is stored in the memory 40, and is used to reconstruct the filter F1 again if an interrogation to that effect arrives from the control computer 20, see FIG. 1. There is a fixed relationship between the prefix list 240 and the filter data list 56, so that the illustrated excerpt from the prefix list is assigned to the filter data 100, for example. The filter F1 is stored in data fields 242 to 252 of the prefix list 240. The AND operation is encrypted in the data field 242. A subsequent address reference in the data field 244 points to the last item encompassed by the AND operation, i.e. to the item i2, see arrow 254. The fact that an item then follows in the filter F1 is noted in the data field 246. An address reference in the data field 248, see arrow 256, refers to the item i1 in the item list 180. The indication of an item is once again noted in the data field 250. An address reference in the data field 252 refers to the associated item i2 in the item list 180.

Figure 4A:
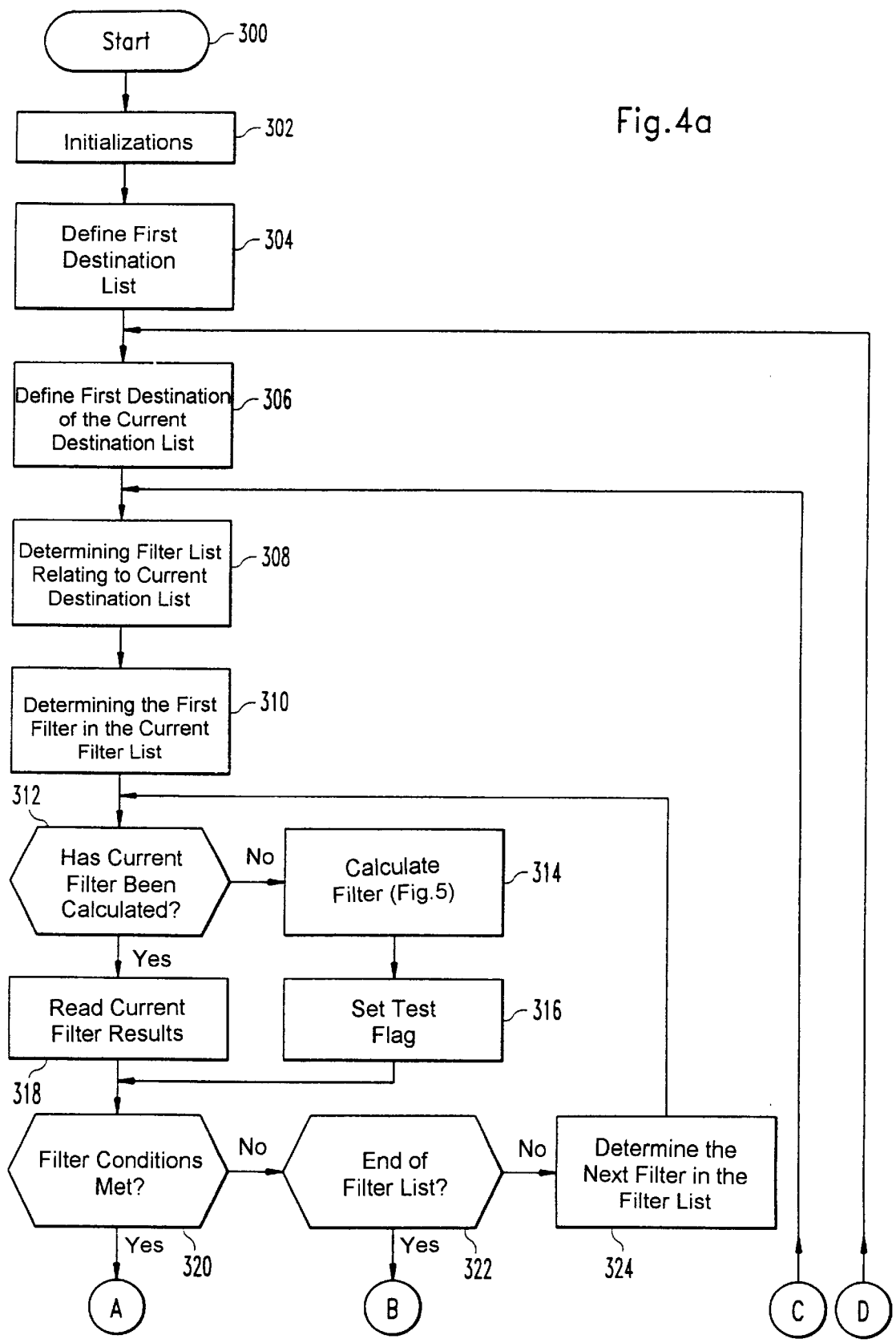
FIGS. 4a and 4b are flow diagrams of method steps executed in the course of relaying the event message.
Figure 4B:
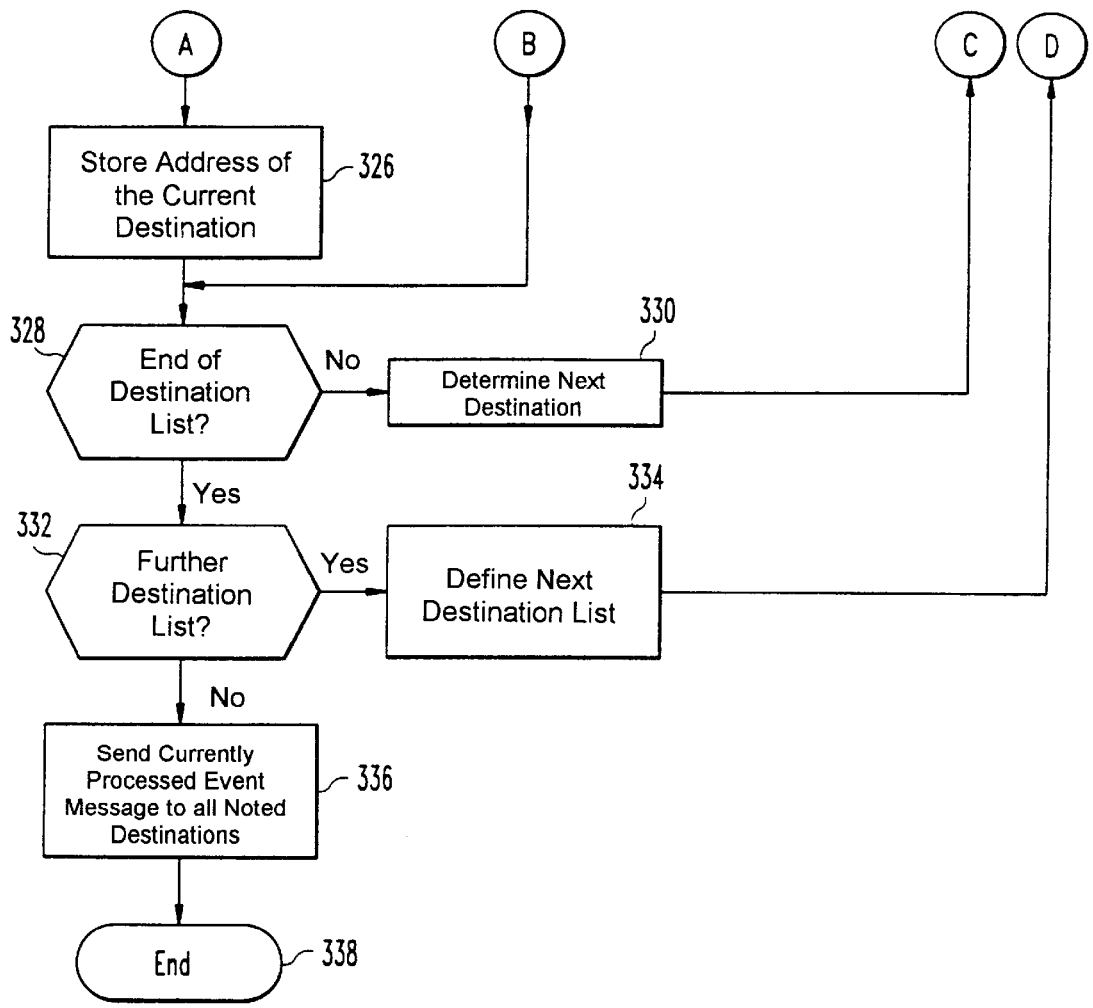

FIGS. 4a and 4b show a flow diagram of the method steps executed in the course of relaying the event messages E. In the course of explaining FIGS. 4a and 4b, reference is also made to FIGS. 1 to 3. The method starts in a step 300. In a step 302, initializations are carried out, in which case, by way of example, auxiliary variables used in the method are set to defined starting values.

In the subsequent method step 304, a first destination list is defined, for example the destination list 52. This is because there are a plurality of destination lists stored in the memory 40, which have to be processed successively. Thus, there are dedicated destination lists for substitute destinations that are only intended to be informed when specific destinations cannot be reached. Furthermore, destination lists are differentiated which contain destinations that confirm the messages or which contain destinations that do not confirm the messages.

In the method step 306, the first destination of the current destination list is defined, for example the destination Z1 of the destination list 52. In the subsequent method step 308, the filter list relating to the current destination is determined with the aid of the address references stored in the destination list. The address reference AVF1, which points to the filter list 54', is used for the first destination Z1 of the destination list 52.

Subsequently, in a method step 310, the first filter in the current filter list is determined. This is the filter F1 for the filter list 54'.

In a method step 312, a test flag stored in the memory 40 is used to determine whether the current filter has already been calculated. If the test flag has the value 0 for the current filter, then the filter has not yet been calculated. In this case, the filter is calculated in a method step 314. The method steps executed in doing this will be explained in more detail below with reference to FIG. 5. Afterwards, the test flag of the current filter is set to the value 1, in order to note the calculation of the filter, see method step 316. If, on the other hand, it is ascertained in method step 312 that the current filter has already been calculated, i.e. the test flag associated with said filter has the value 1, then the method step 312 is followed immediately by a method step 318. In the method step 318, the result for the current filter is read from a value field in the memory 40.

The step 316 or the step 318 is immediately followed by a method step 320, in which a test is performed to determine whether the filter condition of the current filter is met. If this is not the case, then the method step 320 is immediately followed by a method step 322, in which a test is performed to determine whether the end of the current filter list has already been reached. The end of the filter list is only reached when the null pointer 0 occurs in the filter list. If this is not yet the case, then the next filter, for example the filter F2, is determined using the filter list 54. This is done in a method step 324. The method is then continued in step 312. Consequently, the method is in a loop containing the method steps 312 to 324. The loop is processed either until a current filter condition is met in step 320 or until the end of the filter list is ascertained in step 322.

If it is ascertained in the method step 320 that the filter condition is met, then there immediately follows a method step 326, which is no longer part of the loop containing the method steps 312 to 324. Therefore, the processing of a filter list is interrupted as soon as a filter condition is met. In the method step 326, the address of the current destination is stored in a memory for the destination data, for example in a file. A step 328 then follows.

If, on the other hand, the loop containing the method steps 312 to 324 is left in step 322 because the end of the current filter list has been reached, then step 322 is immediately followed by the method step 328. In this case, no new destination is stored in the file for the destination data.

The method step 328 determines whether the end of the destination list 52 has already been reached. This is the case when an address reference AV points to a null pointer 0. If the end of the destination list has not been reached, then the next destination in the destination list is determined, for example the destination Z2 in the destination list 52, see method step 330. The method is subsequently continued in step 308 with the processing of the associated filter list. The method is now in a loop containing the method steps 308 to 330. The loop is left in the method step 328 only when the destination list has been completely processed. If this is the case, then the method step 328 is immediately followed by a method step 332.

The method step 332 determines whether a further destination list has to be processed. If this is the case, then the method step 332 is immediately followed by a method step 334, in which the next destination list is defined. The method is then continued in step 306. Consequently, the method is in a loop containing the method steps 306 to 334. The loop is left in the step 332 only when all of the destination lists to be processed have been processed. If this is the case, then the method step 332 is immediately followed by a method step 336.

In the method step 336, the currently processed event message E is sent to all destinations noted in the destination file. The method is then ended in a step 338.

Figure 5:
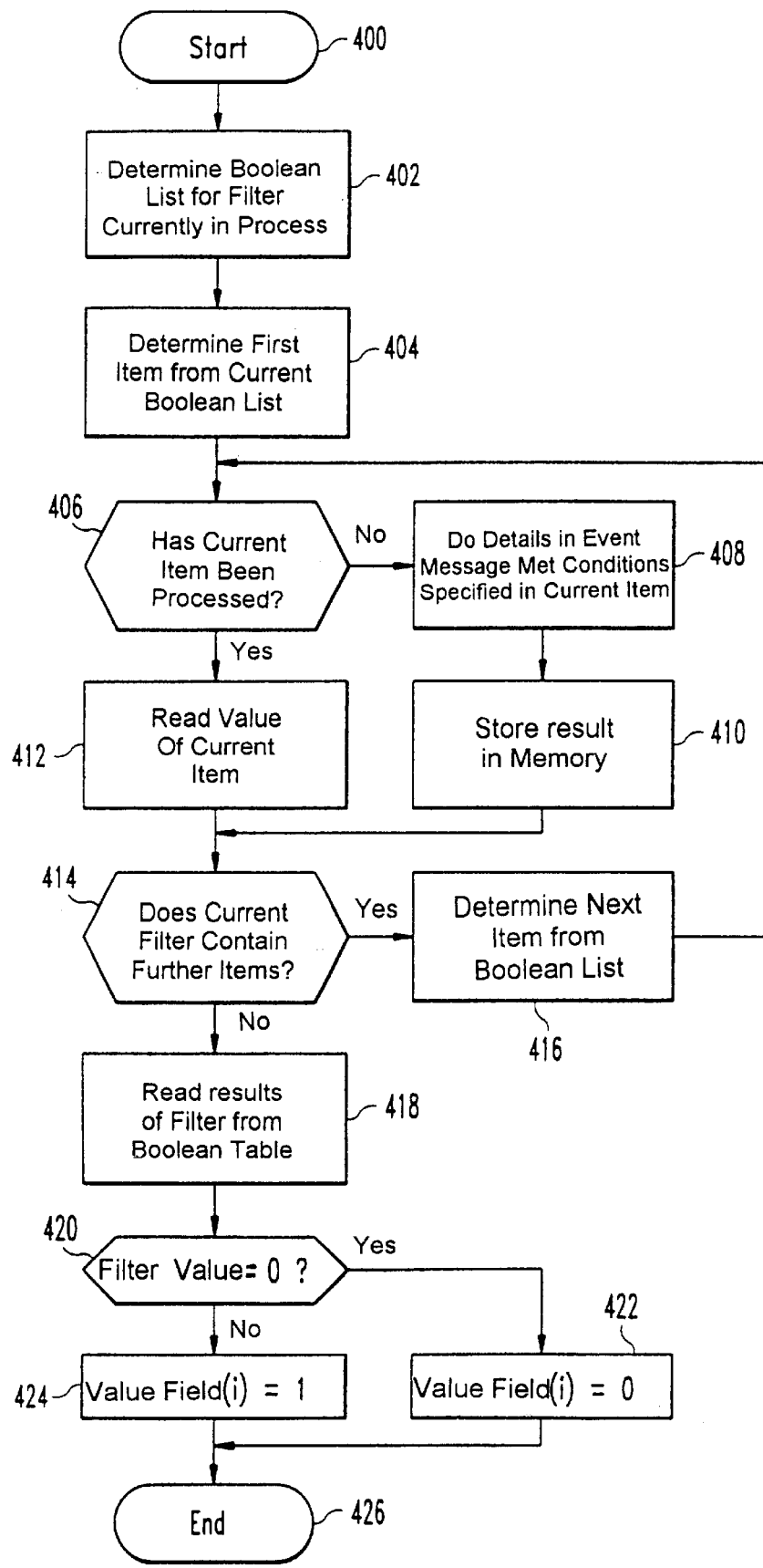
FIG. 5 is a flow diagram of the method steps executed in the course of calculating the filter.

FIG. 5 shows a flow diagram of the method steps executed in the course of calculating a filter, also see step 314 in accordance with FIG. 4a. When explaining FIG. 5, reference is made to FIGS. 1 to 3. The method starts in a method step 400. In a method step 402, the Boolean list for the filter that is currently being processed is determined, for example the Boolean list 150 for the filter F1. In a subsequent method step 404, the first item, for example the item i1, is determined by the current Boolean list and the item list 180.

In a subsequent method step 406, a marker for the current item is used to ascertain whether the current item has already been processed. If the marker for the current item has the value 0, then a method step 408 determines whether the details in the event message E to be processed meet the condition specified in the current item. In this case, the item list 180 and, if appropriate, also the alternative list 210 are again used. The result of this test is then noted in the memory 40 in a method step 410. In addition, the marker for the current item obtains the value 1.

If, on the other hand, it is ascertained in method step 406 that the marker for the current item already has the value 1, then the value associated with the item is read from the memory 40 in a method step 412. The value having been stored in the memory in the course of earlier processing of method step 410.

The method step 410 or 412 is immediately followed by a method step 414, in which a test is performed to determine whether the current filter contains even further items. The value Anz1, for example, is used for that purpose. If the current filter contains even further items, then the method step 414 is immediately followed by a method step 416, in which the next item is determined from the Boolean list. The method is now in a loop containing the method steps 406 to 416. This loop is left in the method step 414 only when, with the aid of the Boolean list 150, the item list 180 and, if appropriate, with the aid of the alternative list 210, values of 0 or 1 have been calculated for all the items of the current filter.

If all the item values have been defined, the method step 414 is immediately followed by a method step 418. In method step 418, the result of the filter is read from the Boolean table associated with the Boolean list for the item values that have been determined.

In a subsequent method step 420, a test is performed to determine whether the filter value is 0 or 1. In the case of the filter value 0, a 0 is likewise noted in the value field for the current filter, see method step 422. If the filter has the value 1, then the value 1 is noted in the value field for the current filter, see method step 424. After the method step 422 or 424, the method is ended in a step 426.

I claim:

1. An operating method, which comprises the steps of:
providing a telecommunications network having a network element with a switching computer at a network node;
generating event messages containing details about events occurring during operation of the network element in the switching computer;
assigning at least one condition to each of a plurality of predetermined destinations for defining each of the predetermined destinations;
organizing the predetermined destinations into a sequence of predetermined destinations in which each of the predetermined destinations occurs once;
testing each of the predetermined destinations in an order prescribed by the sequence of predetermined destinations whether or not the at least one condition is met; and
relaying an event message to a respective predetermined destination of the predetermined destinations if the at least one condition defined for the respective destination is met by the details in the event message to be relayed.

2. The method according to claim 1, which comprises:
defining a set of conditions for at least one of the predetermined destinations; and
terminating a testing of the set of conditions for the predetermined destinations as soon as one of the conditions is met by the details in the event message to be relayed.

3. The method according to claim 2, which comprises ordering the conditions of the set of conditions according to how often they are met by the details in the event messages to be relayed.

4. The method according to claim 1, which comprises:

defining the sequence of predetermined destinations as a list of chained elements, each element in the list of chained elements contains at least one address reference to a subsequent element in the list of chained elements; and assigning each of the chained elements in the list precisely one destination of the sequence of predetermined destinations.

5. The method according to claim 1, which comprises:

logically combining interim results determined from the details in accordance with the at least one condition by logic operations; and using a table in which a logic combination result is stored for all combinations of the interim results for the at least one condition.

6. The method according to claim 5, which comprises:

determining a value of a test flag stored in a memory of the switching computer for the condition when testing the condition, a first value of the test flag indicates that the condition has not yet been tested, and a second value of the test flag indicates that the condition has already been tested;

testing the condition using one of the details in the event message to be relayed and the interim results that have already been determined for the details if the first value of the test flag is detected, a test result is stored in the memory and the test flag obtains the second value; and using a stored test result from the memory if the second value of the test flag is detected.

7. The method according to claim 5, which comprises:

using a marker stored in the memory of the computer if at least one interim result has been determined, a first value of the marker indicates that the interim result has not yet been determined, and a second value of the marker indicates that the interim result has already been determined;

determining the interim result from the details if the marker has the first value, storing the interim result in the memory, and the marker obtains the second value; and using a stored interim result stored in the memory if the marker has the second value.

8. The method according to claim 1, which comprises:

maintaining the predetermined destinations and the at least one condition by at least one control computer; and in a course of maintenance, making reference to data objects whose data contains, in each case, at least one of the predetermined destinations and the at least one condition assigned to the respective at least one of the predetermined destinations.

9. The method according to claim 1, which comprises:

providing the predetermined destinations as addresses of other computers for managing the telecommunications network; and providing the predetermined destinations as protocol files in which the event messages are stored.

10. The method according to claim 1, which comprises providing the network element as a device selected from the group consisting of switching centers, cross-connectors and concentrator units.

11. The method according to claim 1, which comprises providing the telecommunications network as a network selected from the group consisting fixed networks, mobile radio networks and networks having a fixed network component and a mobile radio network component.

12. The method according to claim 8, which comprises performing the maintenance step by at least one of prescribing, erasing, and interrogating the predetermined destinations and the at least one condition assigned to the respective at least one of the predetermined destinations.

13. A network element for operating a telecommunications network, comprising:

a memory for storing a command sequence;

a processing computer connected to said memory, said processing computer receiving said command sequence and thus being programmed to:

generate event messages containing details about events occurring during operation of said processing computer;

assign at least one condition to each of a plurality of predetermined destinations for defining each of the predetermined destinations;

organize the predetermined destinations into a sequence of predetermined destinations in which each of the predetermined destinations occurs once;

test each of the predetermined destinations in an order prescribed by the sequence of predetermined destinations whether or not the at least one condition is met; and relay an event message to a respective predetermined destination of the predetermined destinations if the at least one condition defined for the respective destination is met by the details in the event message to be relayed.

* * * * *